Dec. 5, 1967 J. A. TOURTELLOT ET AL 3,356,374

SUSPENSION SYSTEM FOR STEREOPHONIC PICKUPS

Filed Feb. 15, 1965

INVENTORS
RONALD P. PETERSON AND
JOHN A. TOURTELLOT

BY Eugene M. Whitacre

Attorney

United States Patent Office 3,356,374
Patented Dec. 5, 1967

3,356,374
SUSPENSION SYSTEM FOR STEREOPHONIC PICKUPS

John A. Tourtellot and Ronald P. Peterson, Indianapolis, Ind., assignors to Radio Corporation of America, a corporation of Delaware Filed Feb. 15, 1965, Ser. No. 432,655
4 Claims. (Cl. 274—24)

ABSTRACT OF THE DISCLOSURE

In a tone arm structure having a forward end which rests on a record surface during operation thereof, there is provided an inner pivot to which the rearward portion of a pickup device is connected through slotted openings. The openings allow the pickup device to move forward, with respect to the tone arm longitudinal axis, to a position where the front end of the device engages the tone arm structure with a light wiping contact.

The present invention relates to phonographs, and more particularly to tone arm suspension systems for stereophonic pickups in stereophonic phonographs and like multiple-channel record playing apparatus and equipment.

Present stereophonic photographs require the use of light-weight, low-mass pickup devices for faithfully translating dual-channel sound recordings into corresponding dual-channel output signals which are to be amplified and reproduced as sound in auditory perspective. The dual-channel recording components and the output signals are generally stereophonically related, whereby the reproduced sound is that of the original, for example, as recorded through two laterally-spaced microphones from a single sound source, in accordance with known practice.

As in any phonograph or like equipment, a pivoted tone arm is generally used to carry and guide the pickup device on the record at a desired angle and with a vertical force or downward pressure for proper light tracking of the pickup stylus in the stereophonic sound groove.

In a suspension system for phonograph pickups in tone arms for record players, record changers and the like, adapted for use in accordance with the invention, the free end of the tone arm or tone arm structure is adapted to rest on and be supported by the playing surface of the record, for example, as shown and described in a copending application for Suspension System for Phonograph Pickups, Ser. No. 242,427, filed Dec. 5, 1962, and assigned to the same assignee as this application.

As shown and described in the above application, by resting the free end of the tone arm on the record surface and pivoting the pickup therein for independent vertical movement at the stylus end, friction at the pivot axis for vertical movement may be reduced to a minimum because the pickup and its associated suspension elements can be extremely light in weight and low in mass as is desirable. Such a system has the advantages of: (1) providing a substantially constant tracking force on the pickup stylus; (2) unitary movement of the stylus about the pickup pivot to reduce or prevent wow effects on warped records; and (3) protecting the stylus from the results of the accidental application of additional downward force on the tone arm, which force might otherwise cause record damage.

However, a stereophonic phonograph pickup of light weight and low mass that is free to move vertically independently of the tone arm structure by which it is carried, and effectively damped against lateral movement, may produce distortion due to cross talk which results in a lack of stereophonic separation in the reproduced sound output.

This form of distortion is particularly noticable at the lower frequency end of the audio-frequency response range of the pickup device because the inherent light weight of the pickup device and its pivoted free mounting in the tone arm structure tends to reduce its response to the stereophonic or vertical signal components of the record groove modulation as compared to the lateral record groove modulation components. The inequality in vertical and lateral response is particularly noticeable at the lower end of the audio-frequency range where vertical movement of the stylus tends to cause corresponding movement of the pickup and reduced vertical signal translation.

It is, therefore, an object of this invention to provide an improved suspension system for a stereophonic phonograph pickup or like signal-translating device that is free to move vertically or normal to the plane of the playing surface of a record in operation and independently of the tone arm structure by which it is carried, which provides vertical damping substantially equalized with lateral damping against movement of the pickup device in response to stylus movement vertically and laterally in a stereophonic or like multi-channel sound groove, thereby to reduce cross-talk in the signal output therefrom.

It is also a further object of this invention to provide an improved stereophonic pickup mounting system for tone arm structures in phonograph record playing equipment, for effective equal damping of the pickup device provided by the tone arm structure against vertical and lateral movement with the stylus in response to vertical and lateral components of the record groove modulation, without substantially increasing the overall stylus pressure in the record groove in operation.

It is a still further object of this invention to provide an improved suspension and damping system for a stereophonic phonograph pickup device which is pivotally supported in a tone arm structure and which operates effectively to stabilize the pickup against low-frequency resonance and vertical feedback movement from the stylus and thereby reduce cross talk in the signal output therefrom, without appreciably interferring with the record protection features thereof or increasing the resultant overall stylus pressure in the record groove.

A phonograph record player with a pivoted tone arm has a stereophonic pickup device mounted in the free end of the tone arm. For reasons hereinbefore given, the tone arm structure includes means providing an inner pivot to which the rearward portion of the pickup device is connected for substantially free pivotal movement at its stylus end vertically toward and away from or normal to the record surface, and independently of the tone arm structure by which it is carried.

In accordance with the invention, the inner pivot of the pickup device permits slidable movement of the device in a forward and backward direction with respect to the tone arm longitudinal axis. With the stylus end of the pickup device in a position to engage the sound grooves of a record, the frictional drag of the pickup device on the record causes the pickup device to slide forward to a position where the front end of the device engages the tone arm with a light wiping contact against the tone arm. The wiping of the pickup device against the tone arm provides both vertical and lateral damping of the pickup device to control the response of the pickup to vertical and lateral vibrations imparted to the pickup in a manner to reduce cross talk.

The vertical compliance of the pickup, with its mechanical resistance, and the mass of the pickup tend to resonate broadly in the lower-frequency end of the audio-frequency range in which the pickup or the apparatus operates, thereby tending to distort the vertical response of the pickup. The frictional contact provides coupling of the pickup with the relatively larger mass of the tone arm and thereby increases the damping of the pickup device against movement with the stylus about said pivot in response to vertical components of the groove modulation. The mass component then coupled with said compliance and resistance serves to lower the vertical resonance frequency or bring it below the useful frequency range of the equipment. By thus reducing the vertical resonance at low frequency and equalizing the vertical and lateral damping of the pickup against stylus movement in the stereophonic record groove, cross talk in the signal output from the pickup may be substantially reduced.

The invention will further be understood from the following description of an embodiment thereof when considered in connection with the accompanying drawing, and its scope is pointed out in the appended claims.

In the drawing, FIGURE 1 is a top view, in perspective, of a phonograph record player, representing any suitable record playing apparatus, and provided with a tone arm and pickup suspension system therein embodying the invention;

Figure 1:
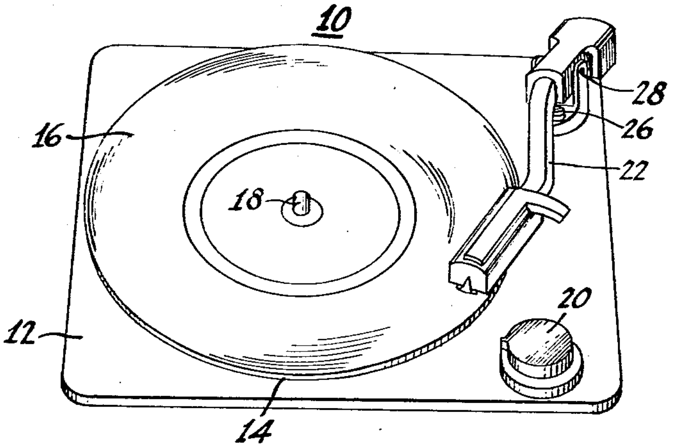

Referring to the drawing, wherein like reference numerals are used to designated like elements and parts in the different figures, and referring particularly to FIGURE 1, a manual record player 10 representing any suitable phonograph record player equipment for which the invention is adapted, is provided with a motor board or turntable base 12 on which is mounted the usual motor-driven turntable 14 with a record 16 located on the turntable 14 in the playing position on the central turntable spindle 18 thereof. The record player is further provided with a suitable control knob 20 mounted on the base for operation in any suitable manner as required.

Figure 2:
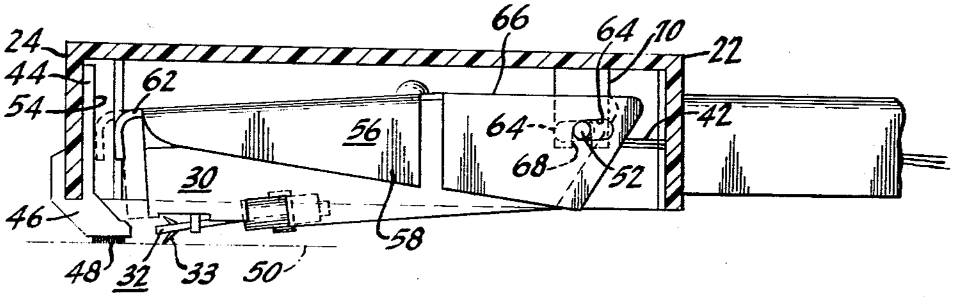
FIGURE 2 is a side view, and partly in section, of the forward end of the tone arm of FIGURE 1 showing the pickup suspension system and interior construction thereof.
Figure 3:
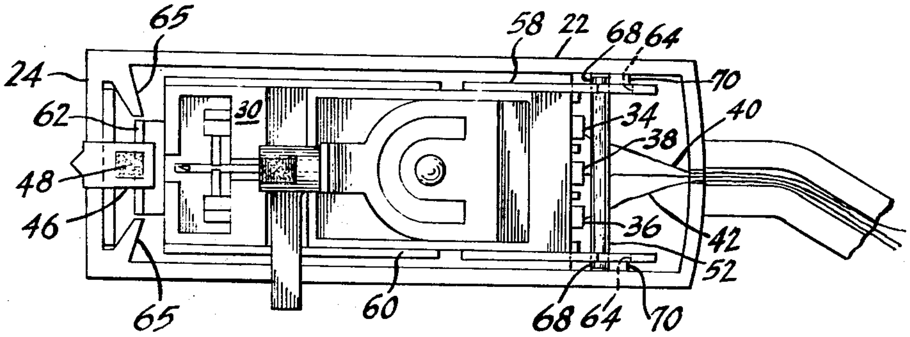
FIGURE 3 is a bottom view of the tone arm end and suspension system of FIGURE 2, showing further details of construction.

Referring to FIGURES 2 and 3 along with FIGURE 1, a pivoted tone arm or tone arm structure 22 laterally and vertically movable at its free or forward end 24 on pivot axes 26 and 28 respectively, is provided for carrying and guiding a stereophonic pickup device 30 therein laterally over the record 16 on the turntable 14. A pickup device 30 which may be of any suitable construction for stereophonic or dual-channel sound translation is adapted to be mounted in a tone arm structure as indicated, with a stylus 33 extending therefrom to track the record groove. The pickup device 30 in the present example is provided with stereophonic signal output terminals 34 and 36 for the two channels, with a common or ground terminal 38 therefor in accordance with known construction for such devices, and these in turn are connected with shielded channel output leads 40 and 42 respectively, as indicated in FIGURE 3.

The forward end 24 of the tone arm 22 also carries a tone arm support or bracket element 44 having a lower outer end or foot 46 extending downwardly therefrom to engage and rest on the upper playing surface of the record. This foot 46 has a bottom pad element 48 of soft material which slidably engages the record surface indicated by the dash-and-dot line 50 of FIGURE 2. The weight of the free end 24 of the tone arm 22 is thus taken entirely by the support elements as it rests or rides smoothly on the record surface in operation. The stylus 32 is thus free of the vertical pressure normally required to support the tone arm and cam respond more faithfully to the record groove modulation, and particularly a stereophonic recording which has both vertical and lateral sound components.

The tone arm further includes an inner pivot or pivot pin 52 to which the pickup device 30 is connected for movement, toward and away from the record surface 50 in a vertical direction, and toward and away from a major vertical surface 54 of the bracket element 44 in a plane substantially parallel to the longitudinal axis of the tone arm 22. In the present embodiment, the pivot for the pickup device 30 is provided in connection with a bracket 56 by which the pickup 30 is carried, and which is in the form of a thin metallic channel, shaped to conform to and receive the pickup device 30 therein as indicated in FIGURES 2 and 3.

The bracket 56 may thus be of a U-shaped cross section having integral side flanges 58 and 60 on either side thereof (forming the legs of a U in transverse cross section) extending downwardly when mounted in position on the pivot pin 52 in the tone arm 22. A damper member 62 overhangs the frontal opening in the front portion of the bracket forming an integral part thereof. The pivot pin 52 extends through transversely aligned elongated bearing openings 64 in the rear ends of the downwardly extending flanges 58 and 60 as indicated in FIGURES 2 and 3. The pickup is thus mounted within bracket 56 and between the flanged sides thereof.

A pair of finger-like members or stops 65 project inwardly from opposing wall members 22 near the forward end 24 of the tone arm as shown in FIGURE 3. The stops serve as guides for the damper member 62 to keep the pickup centrally positioned in the tone arm. The pickup 30 is limited in pivoting downwardly from the tone arm by engagement of the damper member 62 with a rearward extension of the foot 46. The backward movement of the pickup is limited by the end walls of the elongated bearing openings 64.

The elongated openings 64 allow the pickup to move forward when the stylus is positioned to engage a record groove, thereby letting the damper member 62 contact the major surface 54 of the bracket element 44, providing a slight friction in the vertical and lateral directions. A frictional force of one-half gram to one and one-half grams was found to avoid excessive change in stylus force on warped records. This amount of friction is sufficient to reduce low frequency cross talk to an acceptable level, in the manner described in a copending application for Suspension Systems for Stereophonic Pickups, Ser. No. 269,980, filed Apr. 6, 1963, and assigned to the same assignee as this application. It was found desirable that the axis of the elongated bearing openings 64 in the pickup bracket 56 be at an angle of approximately 10 to 30 degrees with respect to the plane of the record surface when the stylus tip 33 is engaging the grooves of a record as shown in FIGURE 2. The friction between the damper member 62 of the bracket 56 and the major surface 54 of the bracket element 44 may become excessive at larger angles, and as the angle is decreased the friction between the damper member and bracket element 44 is reduced.

In the present example, the pivot pin 52 is pressed into the tone arm through open slots 68 extending along the interior side walls of the tone arm 22 upwardly into suitable bosses 70. The pin is retained in a position extending transversely across the tone arm between the bosses by frictionally seating in the slots 68.

Because the tone arm free end 24 is supported by the foot 46 and pad 48 riding on the record surface 50, the tone arm forward or free end 24 is maintained substantially fixed in vertically-spaced relation to the record surface in operation and follows vertical undulations therein due to warpage, the pickup stylus 32 at the same time following the record groove in that surface. Thus relative vertical movement between the pickup stylus tip 33 and the pickup vertical pivot axis or pin 52 in the tone arm is substantially reduced, thereby reducing resultant distortion effects on uneven or warped records.

When the tone arm 22 containing the pickup device 30 is oriented into a record playing position, the pickup and bracket assembly pivot downward about the pivot pin until the stylus tip 33 contacts a record groove. At the same time the elongated bearing openings 64 in the bracket 56 allow the pickup and bracket assembly to move forward with respect to the pivot pin 52, thereby permitting the damper member 62 to frictionally engage the surface 54 of the bracket element 44 and provide a damping contact therewith. The pivotal and forward movements of the pickup and bracket assembly are caused by the gravitational force acting on the mass of said assembly, and the frictional drag of the stylus tip on the record. Due to the distance between the pickup pivot pin 52 and the point of contact of the damper member 62 with the surface 54 and the angle that the elongated axis of the bearing openings make with a horizontal plane when the stylus tip 33 is engaging a groove of a record, a relatively light damping pressure is provided.

The damping contact provides sufficient force to couple the low mass of the pickup along with its mechanical resistance and compliance to the larger mass of the tone arm structure and effectively damp movement of the pickup 30 about the pivot pin 52 in response to the loading of the stylus tip 33 and the stylus pressure in the groove.

The vertical and lateral damping of the pickup against movement due to the vertical and lateral components of the groove modulation transmitted through the stylus are equalized or balanced. The vertical damping equalization obtained by the present pickup is particularly useful and effective at the lower end of the audio frequency range, for example, below 200 cycles, and aids in lowering the vertical resonance frequency of the system.

After the playing of a record, when the tone arm is raised sufficiently above the record surface, either manually or under the influence of an automatic mechanism, the pickup and bracket assembly may retract backwardly with respect to the pivot pin, thereby breaking the frictional contact between the damper member 62 and the surface 54 of the bracket element 44.

In combination with a stereophonic pickup device, the suspension system of the present invention provides equalization of the vertical damping to the lateral damping of the pickup device, by frictionally coupling the device with the tone arm structure. The application of the frictional damping is low enough to allow tracking of the pickup with a relatively light stylus pressure.

What is claimed is:

1. In a phonograph record playing apparatus, the combination with an elongated tone arm movable over a record to be played and supported in spaced relation to and by the playing surface thereof, of a stereophonic pickup device having a stylus, means for pivotally mounting said pickup device on said tone arm for free and independent movement toward and away from said record surface at the stylus end thereof, and for movement along the length of said tone arm, and means comprising a portion of said tone arm for engaging and limiting the movement of said pickup device along the length of said tone arm in the direction of movement of said record.

2. In a phonograph record playing apparatus, the combination with an elongated tone arm movable over a record to be played and supported in spaced relation to and by the playing surface thereof, of a stereophonic pickup device having a stylus in one portion and a pair of transversely aligned slotted openings in another portion thereof, bearing means provided on said tone arm and received by said slotted openings coupling said tone arm to said pickup device for movement of said pickup device toward and away from the record surface at the stylus end thereof, and for movement along the length of said tone arm, and means comprising a portion of said tone arm for engaging and limiting the movement of said pickup device along the length of said tone arm in the direction of movement of said record.

3. In a phonograph record playing apparatus, the combination with a tone arm mounted for lateral and vertical movement at one end over a record turntable, of a pickup device having a casing and a stylus adapted to engage the sound groove of a record on the turntable, means mounting said pickup device on said tone arm for pivotal and sliding motion relative to said tone arm including a pivot pin coupling said pickup device to the movable end of said tone arm, said pivot pin extending transversely through and locked into said movable end of the tone arm to provide a pivot axis of movement for said pickup vertically relative to said record surface and defining a sliding axis of movement for said pickup horizontally relative to said record surface, and a member extending downwardly from said movable end of the tone arm to engage the surface of said record and hold the tone arm in substantially fixed spaced relation thereto in operation, said member having a surface engageable by said pickup casing for imparting a damping action thereto in operation in response to movement of said pickup about said pivot pin.

4. In a phonograph record playing apparatus, the combination with a tone arm mounted for lateral and vertical movement at one end over a record turntable, of a pickup device having a stylus adapted to engage the sound groove of a record on the turntable for vertical and lateral movement therein, of a mounting bracket for receiving said pickup, said bracket including a pair of parallel depending side members extending downwardly therefrom and having a pair of horizontally elongated aligned pin receiving openings formed therein, a pivot pin carried by said tone arm and extending transversely across the interior of the tone arm at said one end, being received through said pin receiving openings and coupling said bracket and pickup to said tone arm structure for slidable and pivotal movement therein, and means connected with said tone arm one end remote from and in oppositely spaced relation to said pivot pin and defining a surface for frictionally engaging a surface of said pickup device substantially normal to the plane of said record surface upon slidable and pivotal movement of said bracket and pickup within said tone arm structure, said means being operable for equalizing with relatively low contact pressure the damping of the pickup device against vertical and lateral movement in response to stylus movement in said sound groove.

References Cited

UNITED STATES PATENTS

| | | | |
|---|---|---|---|
| 2,557,176 | 6/1951 | Cranmer | 274—24 |
| 2,586,362 | 2/1952 | Martin | 274—24 |

LEONARD FORMAN, *Primary Examiner.*

FELIX J. D'AMBROSIO, *Assistant Examiner.*